(12) United States Patent
Onishi

(10) Patent No.: US 7,244,059 B2
(45) Date of Patent: Jul. 17, 2007

(54) OPTICAL WAVEGUIDE, ILLUMINATION DEVICE, ELECTRO-OPTICAL DEVICE, AND ELECTRONIC APPARATUS

(75) Inventor: Yasunori Onishi, Nagano (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/214,596

(22) Filed: Aug. 30, 2005

(65) Prior Publication Data

US 2006/0061705 A1    Mar. 23, 2006

(30) Foreign Application Priority Data

Sep. 21, 2004  (JP)  ............................. 2004-273077

(51) Int. Cl.
*F21V 7/04* (2006.01)
(52) U.S. Cl. ................... 362/628; 349/68; 362/613
(58) Field of Classification Search ......... 362/600–634
See application file for complete search history.

(56) References Cited

U.S. PATENT DOCUMENTS

| 5,673,128 | A | * | 9/1997 | Ohta et al. ............. 349/62 |
| 5,914,759 | A | * | 6/1999 | Higuchi et al. ........... 349/57 |
| 7,052,168 | B2 | * | 5/2006 | Epstein et al. ........... 362/625 |
| 2002/0021563 | A1 | * | 2/2002 | Ohsumi ................. 362/31 |
| 2004/0264211 | A1 | * | 12/2004 | Han et al. .............. 362/561 |
| 2005/0135115 | A1 | * | 6/2005 | Lamb et al. ............. 362/613 |

FOREIGN PATENT DOCUMENTS

| JP | 08-201633 | 8/1996 |
| JP | 2001-281655 | 10/2001 |
| JP | 3251452 | 11/2001 |
| KR | 10-0221751 | 6/1999 |

OTHER PUBLICATIONS

Communication from Korean Patent Office regarding counterpart application.

* cited by examiner

*Primary Examiner*—Ali Alavi
*Assistant Examiner*—Hargobind S. Sawhney
(74) *Attorney, Agent, or Firm*—Harness, Dickey & Pierce, P.L.C.

(57) ABSTRACT

An illumination device includes an optical waveguide that has light incident end faces formed at both ends thereof; and light sources that are disposed on the light incident end faces formed at both ends of the optical waveguide. A reflective surface of the optical waveguide has first and second reflective surfaces intersecting at a predetermined boundary line, and a light-emitting surface of the optical waveguide has first and second regions divided by the predetermined boundary line. When the light sources provided at one end of the optical waveguide are turned on, light is emitted such that one of the first and second regions is brighter than the other.

7 Claims, 9 Drawing Sheets

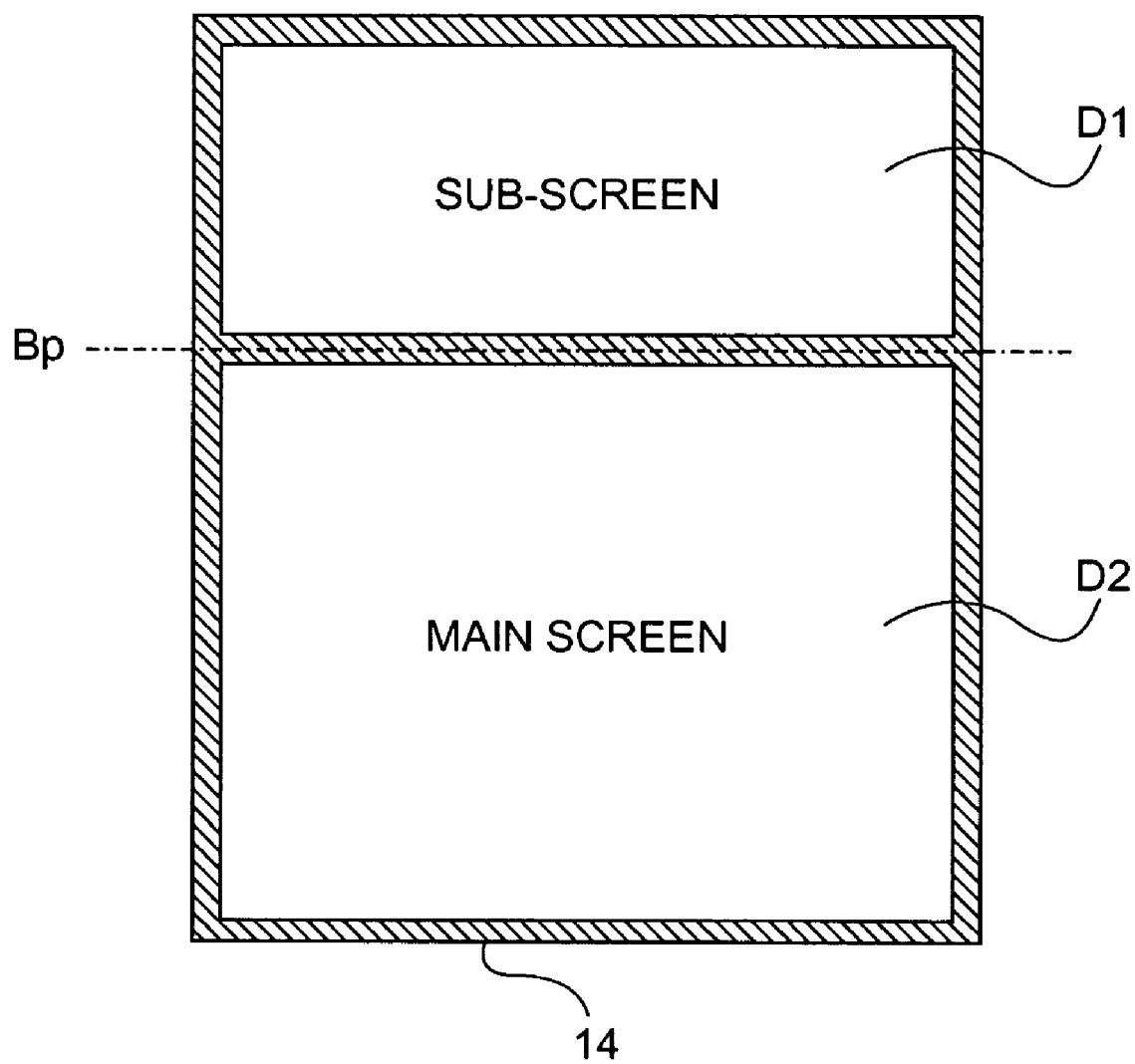

US 7,244,059 B2

OPTICAL WAVEGUIDE, ILLUMINATION DEVICE, ELECTRO-OPTICAL DEVICE, AND ELECTRONIC APPARATUS

RELATED APPLICATIONS

This application claims priority to Japanese Patent Application No. 2004-273077 filed Sep. 21, 2004 which is hereby expressly incorporated by reference herein in its entirety.

BACKGROUND OF THE INVENTION

1. Technical Field

The present invention relates to an illumination device, such as a backlight unit used for a liquid crystal display of a cellular phone, and to an optical waveguide for the same.

2. Related Art

In liquid crystal display devices, a backlight unit is provided on a rear surface of a liquid crystal display panel in order to perform transmissive display. Generally, the backlight unit is composed of an illumination device which includes alight source, an optical waveguide for radiating light emitted from the light source onto a rear surface of the liquid crystal display panel as planar light, a diffusion sheet for diffusing the light emitted from the optical waveguide, and a prism sheet for condensing the light.

As a cellular phone in which a liquid crystal display device is used for a display unit, a cellular phone of a double-sided panel type has been known in which a main body has a large main display panel provided at an inner surface side of a foldable display unit and a small sub-display panel provided at a rear surface side. In contrast, in recent years, a slide-type cellular phone or a rotation-type cellular phone has been on sale. The slide-type cellular phone has a structure in which a display unit is mounted on a main body unit so as to be separate from the main body and the rotation-type cellular phone has a structure in which a main display panel normally located at an inner surface side is reversible so as to be exposed to the outside. Generally, these cellular phones mostly have a structure in which only one large main display panel is provided without a sub-display panel and the main display panel serves as the sub-display panel.

However, in the above-mentioned slide-type or rotation-type cellular phone, simple display information, such as the time and remaining battery level displayed on the sub-display panel in the case of a double-sided type is also displayed on the one main display panel. For this reason, even though the simple display information can be confirmed, it is necessary that the entire liquid crystal display panel be illuminated whenever the display information is confirmed, which results in an increase in consumed power.

In addition, as an example of the illumination device used for liquid crystal display devices, Japanese Unexamined Patent Application Publication No. 2001-281655 discloses an illumination device in which a reflective surface of an optical waveguide is a curved surface having an optical focus and which becomes a surface light source that has low power consumption and low luminance brightness in order to be used for a backlight of the liquid crystal display panel.

SUMMARY

An advantage of the invention is that it provides an illumination device in which a region of an optical waveguide is divided into regions and light is emitted from each of the divided regions for partially illuminating a liquid crystal panel, thereby achieving low power consumption.

According to a first aspect of the invention, an illumination device includes an optical waveguide that has light incident end faces formed at both ends thereof; and light sources that are disposed on the light incident end faces formed at both ends of the optical waveguide. A reflective surface of the optical waveguide has first and second reflective surfaces intersecting at a predetermined boundary line and a light-emitting surface of the optical waveguide has first and second boundary regions divided by the predetermined boundary line. When the light sources provided at one end of the optical waveguide are turned on, light is emitted such that one region of the first and second regions is brighter than the other.

The illumination device can be used, for example, for a backlight of a liquid crystal display device and includes the optical waveguide that has the light incident end face formed at both ends thereof and the light sources that are disposed on the light incident end faces at both ends of the optical waveguide. Here, for the light source, for example, LEDs are used. The optical waveguide is divided into two regions by the predetermined boundary line, and the reflective surfaces of the respective regions become first and second reflective surfaces. The first and second reflective surfaces cross each other at the predetermined boundary line. According to this aspect, when the light sources provided at one end of the optical waveguide are turned on, light can be emitted such that one of the first and second regions is brighter than the other. In addition, the phrase 'the light sources disposed on the light incident end faces formed at both ends of the optical waveguide' includes the case in which the light sources are disposed at any locations of the light incident end faces. That is, it includes the case in which the light sources are disposed at the ends of the light incident end faces, that is, corners of the sides of the optical waveguide, in addition to the case in which the light sources are disposed near the center in a longitudinal direction of the light incident end face.

Preferably, the first reflective surface reflects the light emitted from the light source disposed on the light incident end face away from the first reflective surface and allows the light to be emitted from the first region, and the second reflective surface reflects the light emitted from the light source disposed on the light incident end face away from the second reflective surface and allows the light to be emitted from the second region. Therefore, when the light sources at one side are turned on, light can be emitted from one of the two regions divided by the boundary line.

Preferably, the optical waveguide has a cross-section in which a distance between the light-emitting surface and the reflective surface gradually decreases from the predetermined boundary line toward the light incident end faces of both ends. As such, the light incident on one light incident end face is totally reflected with respect to the light-emitting surface in the region of the optical waveguide having the light incident end face, passes through the predetermined boundary line, and is emitted from the light-emitting surface to the exterior in the region of the optical waveguide. Therefore, when the light is incident on the optical waveguide through one light incident end face, only the light-emitting surface in the region opposite to the region having the light incident end face can be brightly illuminated. In addition, by using illumination device having such an optical waveguide, it is possible to suppress the influence of so-called 'light irregularity' that diffusibility of the light generated in a region near point light sources such as the LEDs is not sufficient to become dark between light components. In addition, it is possible to increase a light-emitting area of the light-emitting surface.

Preferably, at least one of the first and second reflective surfaces has a predetermined pattern. According to this aspect, at least one of the first and second reflective surfaces has an angle pattern. An inclined surface of one angle pattern serves to decrease an angle of the light incident on the reflective surface with respect to the light from one of two light incident end faces, and serves to increase an angle of the light incident on the reflective surface with respect to the light from the other of two light incident end faces. Therefore, since the light incident on one light incident end face does not exceed a critical angle with the light-emitting surface, the light is totally reflected at all times. In addition, since the light incident on the other light incident end face exceeds the critical angle with any light-emitting surface, the light is emitted to the exterior from the light-emitting surface. Therefore, it is possible to allow the optical waveguide to partially emit the light by performing the on/off control of the light sources disposed at both ends of the optical waveguide.

According to a second aspect of the invention, an illumination device includes an optical waveguide that has light incident end face formed at both ends thereof and is wedge-shaped in which a distance between a light-emitting surface and a reflective surface gradually decreases from the light incident end face formed at one end thereof; and light sources that are disposed on the light incident end faces of both ends of the optical waveguide. The reflective surface of the optical waveguide has first and second reflective surfaces divided by a predetermined boundary line, and at least one of the first and second reflective surfaces has a predetermined pattern. The light-emitting surface of the optical waveguide has first and second regions divided by the predetermined boundary line. When the light sources provided at one end of the optical waveguide are turned on, light is emitted such that one region of the first and second regions is brighter than the other.

The illumination device can be used, for example, as a backlight unit for a liquid crystal display device, and has an optical waveguide that has light incident end faces formed at both ends thereof and light source that are disposed on the light incident end faces of both ends of the optical waveguide. The optical waveguide is a 'wedge-shape' section in which a distance between a light-emitting surface and a reflective surface gradually decreases from the light incident end face formed at one end thereof. The optical waveguide is divided into two regions by the predetermined boundary line, and the reflective surfaces of the respective regions of the optical waveguide has first and second reflective surfaces divided by the predetermined boundary line, and at least one of the first and second reflective surfaces has a predetermined pattern. According to this aspect, when the light sources provided at one end of the optical waveguide are turned on, light can be emitted such that one region of the first and second regions is brighter than the other. In addition, the phrase 'the light sources disposed on the light incident end faces formed at both ends of the optical waveguide' includes the case in which the light sources are disposed at any locations of the light incident end faces. That is, it includes the case in which the light sources are disposed at the ends of the light incident end faces, that is, corners of the sides of the optical waveguide, in addition to the case in which the light sources are disposed near the center in a longitudinal direction of the light incident end face.

A preferred example of the illumination device can include a plurality of prism sheets disposed at the light-emitting surface side of the optical waveguide such that the sides where prism shapes extend are orthogonal to each other. Another preferred example of the illumination device can include a prism sheet disposed at the light-emitting surface side of the optical waveguide such that the prism shape is disposed opposite to the light-emitting surface of the optical waveguide.

According to a third aspect of the invention, an electro-optical device includes a display panel and the illumination device used as a backlight of the display panel. According to the electro-optical device, it is possible to allow a portion of the illumination device to emit the light, thereby performing display on a portion of the display panel.

Preferably, the display panel is divided into two portions by a predetermined display dividing line, and the display panel and the illumination device are relatively disposed such that the predetermined display dividing line aligns with the predetermined boundary line. Therefore, it is possible to illuminate one region of the regions divided by the display dividing line of the display panel through the illumination device selectively. In addition, it is not necessary that the display dividing line perfectly align with the boundary line.

Preferably, the predetermined display dividing line divides the display panel into a transmissive display region and a reflective display region having a higher reflectance than the transmissive display region. By changing the reflectance of the display panel using the predetermined display dividing line as the boundary, a portion of the display panel can be constructed as a transmissive display region and the other portion of the display region can be constructed as a reflective display region.

Preferably, when display is performed on only one region of the two regions, only the light sources corresponding to one region are turned on. As a result, by using the turned on light source, only one of the two regions divided by the display dividing line of the display panel is selectively illuminated by the illumination device.

According to a fourth aspect of the invention, an electronic apparatus has the above-mentioned electro-optical device in a display unit.

According to a fifth aspect of the invention, an optical waveguide includes a light-emitting surface that emits light; and a reflective surface that is disposed opposite to the light-emitting surface. The reflective surface has first and second reflective surfaces intersecting at a predetermined boundary line, and the optical waveguide has a cross-section in which a distance between the light-emitting surface and the reflective surface gradually decreases from the predetermined boundary line toward the light incident end faces of both ends. The light sources are provided at the ends of the optical waveguide and it is possible to allow only one of the two regions divided by the boundary line to emit the light by turning on only one of the light sources at one side.

According to a sixth aspect of the invention, an optical waveguide includes a light-emitting surface that emits light; and a reflective face that is disposed opposite to the light-emitting surface. The optical waveguide has a wedge-shaped section in which a distance between a light-emitting surface and a reflective surface gradually decreases from the light incident end face formed at one end thereof, the reflective surface has first and second reflective surfaces divided by a predetermined boundary line, and at least one of the first and second reflective surfaces has a predetermined pattern. The light sources are provided at the ends of the optical waveguide and it is possible to allow only one of the two regions divided by the boundary line to emit the light by turning on only one of the light sources at one side.

BRIEF DESCRIPTION OF THE DRAWINGS

The invention will be described with reference to the accompanying drawings, wherein like numbers reference like elements, and wherein:

FIG. 5 is a plan view of the liquid crystal display device shown in FIG. 1;

DESCRIPTION OF THE EMBODIMENTS

Hereinafter, the preferred embodiments of the invention will be described with reference to the accompanying drawings.

First Embodiment

Figure 1:
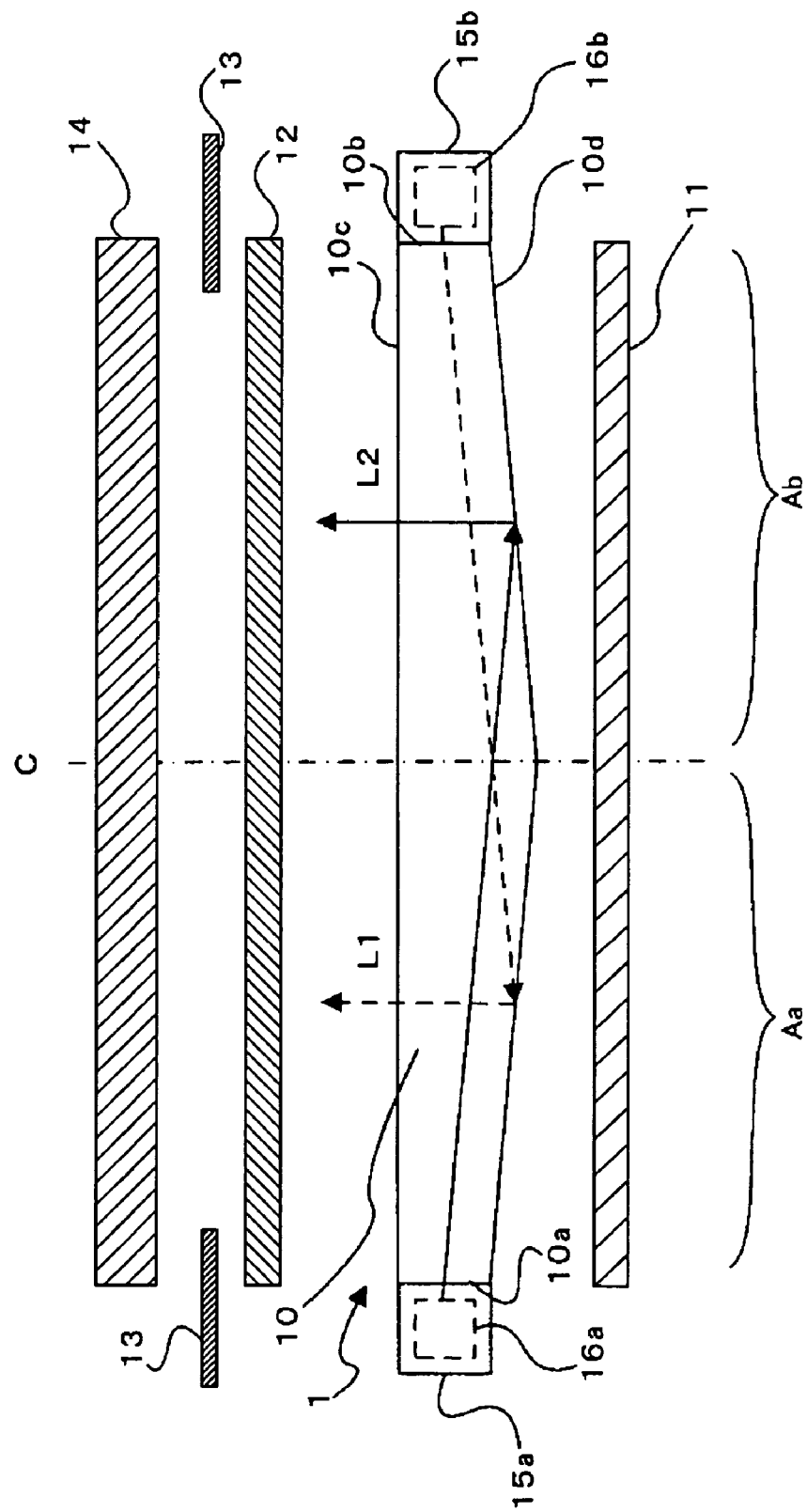
FIG. 1 is a lateral view schematically showing the structure of a liquid crystal display device of the invention.

FIG. 1 is a lateral view schematically showing the structure of a liquid crystal display device 100 in which an illumination device according to a first embodiment of the invention is applied. Even though individual constituent elements are shown separated by gaps for convenience of description in FIG. 1, actually, they constitute a liquid crystal display device 100 in a state in which they overlap in a vertical direction of the drawing.

The liquid crystal display device 100 includes an illumination device 1. A diffusion sheet 12 and a liquid crystal display panel 14 are provided on the illumination device 1, and a reflection sheet 11 is provided below the illumination device 1. The liquid crystal display panel 14 corresponds to a display panel of a cellular phone or the like, and an optical waveguide 10 has a display area, which is almost equal to a light-emitting area of the liquid crystal display panel 14. In addition, the structure of the liquid crystal panel in the invention is not particularly limited.

The illumination device 1 has a structure in which there are light source units 15a and 15b formed at both ends of the optical waveguide 10. The light source unit 15a has a plurality of LEDs 16a each serving as a point light source, and emits light on an end face 10a (hereinafter, referred to as 'a light incident end face') of the optical waveguide 10 facing the light source unit. In addition, the light source unit 15b has a plurality of LEDs 16b each serving as a point light source, and emits light on an end face 10b of the optical waveguide 10 facing the light source unit. Hereinafter, the two light source units 15a and 15b are called a light source unit 15 when it is unnecessary to distinguish them from each other. Similarly, the plurality of LEDs 16a and 16b are called an LED 16 when it is unnecessary to distinguish them from each other.

The optical waveguide 10 has a rectangular shape in plan view and is composed of a transparent resin, such as an acrylic resin. A top surface 10c of the optical waveguide 10 is a surface for emitting light (hereinafter, referred to as 'a light-emitting surface'), and a bottom surface 10d of the optical waveguide is a surface for reflecting light (hereinafter, referred to as 'a reflective surface'). The optical waveguide 10 is formed such that the thickness thereof is largest at a location of a boundary line C. In addition, the optical waveguide 10 is formed such that the thickness thereof, that is, a distance between the light-emitting surface 10c and the reflective surface 10d gradually decreases from the location of the boundary line C toward the light incident end faces 10a and 10b located at both ends. Hereinafter, using the boundary line C, a region, which has the light source unit 15a and is located at the left side of the drawing, is called a left region Aa, and a region, which has the light source unit 15b and is located at the right side of the drawing, is called a right region Ab.

Light L2 emitted from the plurality of LEDs 16a included in the light source unit 15a located at the left side is incident into the optical waveguide 10 through the light incident end face 10a located at the left end of the optical waveguide 10 and is repeatedly reflected between the light-emitting surface 10c and the reflective surface 10d of the optical waveguide 10, whereby the propagation direction of the light L2 is changed. When an angle formed by the light-emitting surface 10c and the light L2 exceeds a critical angle in the right region Ab, the light L2 is emitted from the light-emitting surface 10c to the exterior. On the other hand, light L1 emitted from the plurality of LEDs 16b included in the light source unit 15b located at the right side is incident into the optical waveguide 10 through the light incident end face 10b located at the right end of the optical waveguide 10 and is repeatedly reflected between the light-emitting surface 10c and the reflective surface 10d of the optical waveguide 10, whereby the propagation direction of the light L1 is changed. When an angle formed by the light-emitting surface 10c and the light L1 exceeds a critical angle in the left region Aa, the light L1 is emitted from the light-emitting surface 10c to the exterior.

The diffusion sheet 12 is provided between the illumination device 1 and the liquid crystal panel 14. The diffusion sheet 12 serves to diffuse the light L1 or L2 emitted from the optical waveguide 10 to regulate brightness in a light-emitting surface of the illumination device 1.

A double-sided tape 13 is used in order to bond the illumination device 1 to the liquid crystal panel 14. Although described in detail below, the double-sided tape 13 serves to prevent the light emitted from the LEDs 16 from leaking toward the upper side from the light source unit 15. For this reason, a portion of the double-sided tape 13 has a light shielding property.

Path of Light in Optical Waveguide

Next, the paths of the light L1 and L2 in the optical waveguide 10 of the illumination device 1 will be described in detail. A predetermined pattern is formed in the reflective surface 10d of the optical waveguide 10 in order to change the angle of the light. An example of such a pattern is shown in FIG. 2.

Figure 2A:
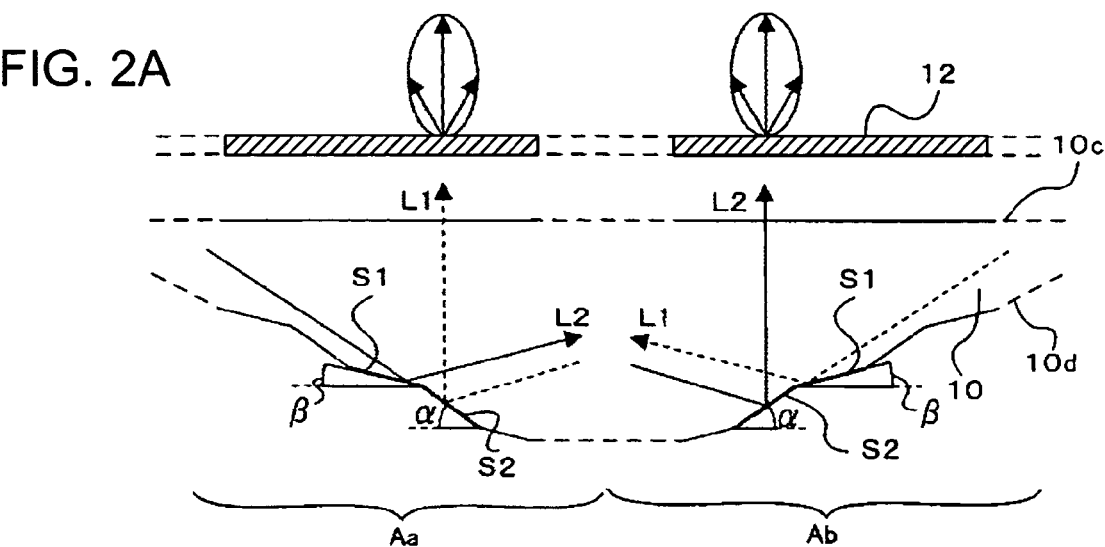
FIG. 2 is a lateral view of an illumination device according to a first embodiment of the invention.

FIG. 2A schematically shows a direction in which the light L2 in the optical waveguide 10 is reflected as a solid line and a direction in which the light L1 in the optical waveguide 10 is reflected as a broken line. The pattern of the reflective surface 10*d* of the optical waveguide 10 has an angled shape. One inclined surface of the angled shape is defined as a reflective surface S1 and the other surface of the angled shape is defined as a reflective surface S2. In addition, an inclination angle, which the reflective surface S1 forms with respect to the light-emitting surface 10*c*, is defined as 'β', and an inclination angle, which the reflective surface S2 forms with respect to the light-emitting surface 10*c*, is defined as 'α'. The pattern is formed in a bilateral symmetric manner using the boundary line C.

Figure 2B:
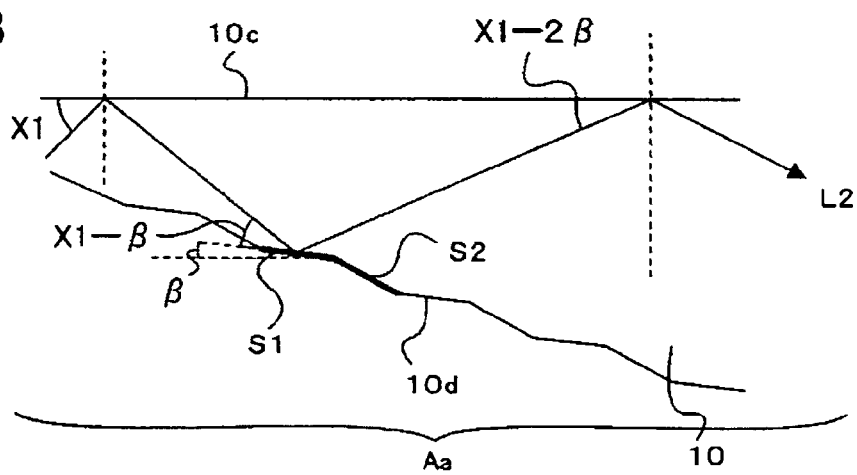

The light L2 emitted from the plurality of LEDs 16*a* is incident into the left region Aa through the light incident end face 10*a* of the optical waveguide 10, and is repeatedly reflected between the reflective surfaces S1 and S2 and the light-emitting surface 10*c*. An aspect of the light L2 at this time is magnified and is schematically shown in FIG. 2B. As shown in FIG. 2B, if the light L2 incident at an angle of X1 with respect to the light-emitting surface 10*c* is totally reflected, and is incident on the reflective surface S1, the reflective surface S1 has an inclination angle β such that an incident angle of the light L2 decreases with respect to the light-emitting surface 10*c*. Therefore, the light L2 has an incident angle of (X1−β) with respect to the reflective surface S1. When the light L2 is totally reflected again, the light L2 has an incident angle of (X1−2β) with respect to the light-emitting surface 10*c*. In this way, the light L2 is repeatedly reflected by the light-emitting surface 10*c* and the reflective surface S1, so that the angle X1 of the light L2 incident on the light-emitting surface 10*c* is reduced by 2β. Therefore, the light L2 does not exceed the critical angle with respect to the light-emitting surface 10*c*.

In addition, when the light L2 is totally reflected on the reflective surface S2, the reflective surface S2 has an inclination angle α such that an incident angle of the light L2 decreases with respect to the light-emitting surface 10*c*. Therefore, the angle of the light L2 incident on the light-emitting surface 10*c* decreases by 2α whenever the light L2 is reflected. Even in this case, the light L2 does not exceed the critical angle with respect to the light-emitting surface 10*c*. Therefore, even when the light L2 is totally reflected on any one of the reflective surfaces S1 and S2 in the left region Aa, the light L2 does not exceed the critical angle, so that it is not emitted from the light-emitting surface 10*c* to the exterior.

Figure 2C:
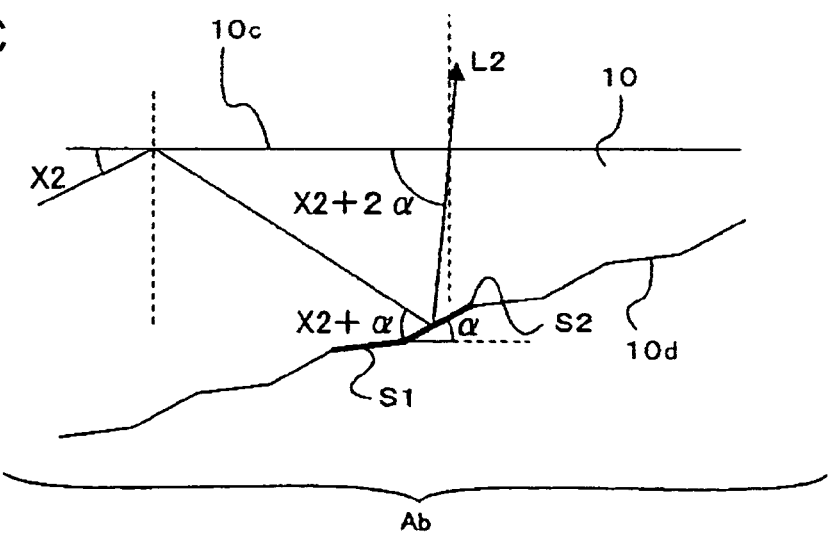

The light L2 passes through the left region Aa of the optical waveguide 10 and is then incident into the right region Ab from the boundary line C of the optical waveguide 10. An aspect of the light L2 at this time is magnified and is schematically shown in FIG. 2C. As shown in FIG. 2C, if the light L2 incident at an angle of X2 with respect to the light-emitting surface 10*c* is totally reflected, and is incident on the reflective surface S2, the reflective surface S2 has an inclination angle α such that an incident angle of the light L2 increases with respect to the light-emitting surface 10*c*. Therefore, the light L2 has an incident angle of (X2+α) with respect to the reflective surface S2. When the light L2 is totally reflected again, the light L2 has an incident angle of (X2+2α) with respect to the light-emitting surface 10*c*. In this way, the light L2 is repeatedly reflected by the light-emitting surface 10*c* and the reflective surface S2, so that the angle X2 of the light L2 incident on the light-emitting surface 10*c* increases by 2α.

In addition, when the light L2 is totally reflected on the reflective surface S1, the reflective surface S1 has an inclination angle β such that an incident angle of the light L2 increases with respect to the light-emitting surface 10*c*. Therefore, the angle of the light L2 incident on the light-emitting surface 10*c* increases by 2β whenever the light L2 is reflected. Therefore, in the right region Ab of the optical waveguide 10, the light L2 is repeatedly reflected on the reflective surfaces S1 and S2 several times, so that the angle of light incident on the light-emitting surface 10*c* gradually increases. After that, when the light exceeds the critical angle, it is emitted from the light-emitting surface 10*c* to the exterior.

The light L1 emitted from the LED 16*b* is similar to the light L2. The light L1 emitted from the LED 16*b* is incident in the right region Ab through the light incident end face 10*b* of the optical waveguide 10. In the right region Ab of the optical waveguide 10, since the light L1 is repeatedly reflected between the light-emitting surface 10*c* and the reflective surfaces S1 and S2 having the inclination angles α and β such that the incident angle of the light L1 decreases with respect to the light-emitting surface 10*c*, the angle at which the light L1 is incident on the light-emitting surface 10*c* gradually decreases. Therefore, in the right region Ab of the optical waveguide 10, the light L1 does not exceed the critical angle with respect to the light-emitting surface 10*c*, so that the light L1 is not emitted from the light-emitting surface 10*c* to the exterior. However, if the light L1 is continuously incident in the left region Aa from the boundary line C of the optical waveguide 10, since the light L1 is repeatedly reflected between the light-emitting surface 10*c* and the reflective surfaces S1 and S2 having the inclination angles α and β such that the incident angle of the light L1 increases with respect to the light-emitting surface 10*c*, the angle at which the light L1 is incident on the light-emitting surface 10*c* gradually increases. After that, the light L1 exceeds the critical angle with respect to the light-emitting surface 10*c*, so that the light L1 is emitted from the light-emitting surface 10*c* of the left region Aa of the optical waveguide 10.

As can be apprehended from the above-mentioned description, the illumination device 1 has the following two characteristics. When the LEDs 16*a* of the light source unit 15*a* are turned on, the light is emitted from only the light-emitting surface 10*c* of the right region Ab of the optical waveguide 10 to the exterior, and is not emitted from the light-emitting surface 10*c* of the left region Aa of the optical waveguide 10. In contrast, when the LEDs 16*b* of the light source unit 15*b* are turned on, the light is emitted from only the light-emitting surface 10*c* of the left region Aa of the optical waveguide 10 to the exterior, and is not emitted from the light-emitting surface 10*c* of the right region Ab of the optical waveguide 10. That is, the optical waveguide of the illumination device 1 has a structure in which the light-emitting surface of a region having the light incident end face where the light emitted from the LEDs having been turned on is incident does not become bright, but the light-emitting surface of a region not having the light incident end face where the light emitted from the LEDs having been turned on is incident becomes bright. Therefore, in order to make the entire surface of the light-emitting surface become bright, the LEDs 16*a* and 16*b* have to be turned on.

Here, ranges of the inclination angles α and β will be described. The inclination angle β is in a range of $0 \leq \beta \leq \alpha$. When the inclination angle β satisfies the condition β=0, it means that the reflective surface and the light-emitting surface are parallel to each other. When the inclination angle β satisfies the condition β=α, it means that the reflective surface is an inclined surface which does not have a pattern.

The condition $\beta=0$ is a minimum condition for specularly reflecting the light between the light-emitting surface and the reflective surface at the minimum such that the light does not exceed the critical angle with respect to the light-emitting surface. Even in the case of $\beta=\alpha$, that is, in the case where the reflective surface does not have the pattern, the optical waveguide can have the characteristics of the invention. However, the case of $\beta<\alpha$, that is, the case where the reflective surface has the pattern is preferable because the inclination of the reflective surface can be alleviated, thereby enabling a decrease in the thickness of the optical waveguide.

On the other hand, a preferable range of the inclination angle $\alpha$ is determined by embodiments of the liquid crystal display device. Since the liquid crystal display device 100 according to the present embodiment has a structure in which only the diffusion sheet 12 is disposed between the liquid crystal panel 14 and the illumination device, it is preferable that the light L2 be incident in a direction substantially perpendicular to the diffusion sheet 12. For this reason, it is preferable that the inclination angle $\alpha$ be in a range of 35° to 50°.

Optical Waveguide Having Asymmetric Shape with Respect to Boundary Line

In the above-mentioned illumination device 1, the boundary line C is located at the center of the optical waveguide 10, and the shape of the optical waveguide 10 and the pattern of the reflective surface are bilaterally symmetric with respect to the boundary line C. However, even when the boundary line C shifts from the center of the optical waveguide 10 toward any either the left or right side, as described above, the light can be emitted from the right and left regions by the LEDs which have been turned on.

Figure 3A:
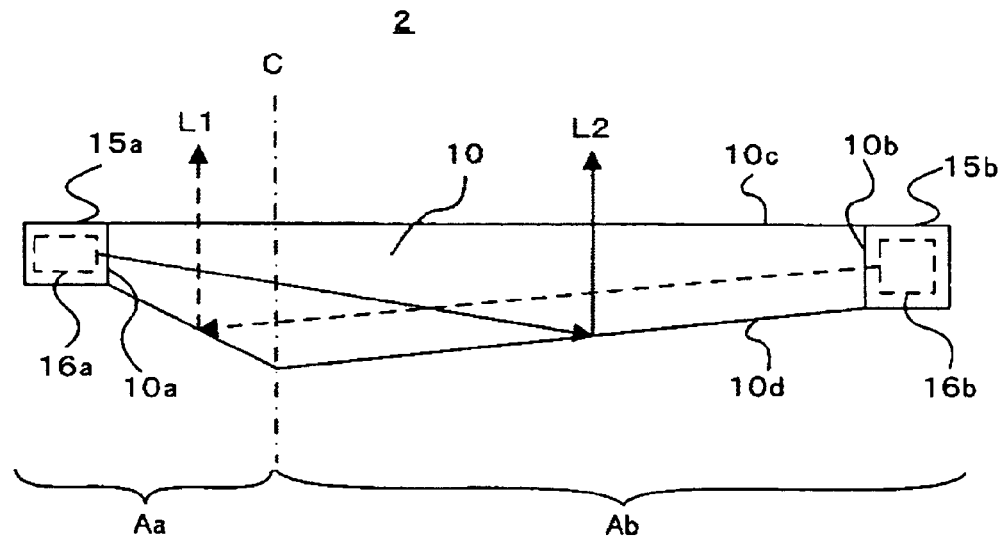
FIG. 3 is a lateral view of the illumination device according to the first embodiment of the invention.
Figure 3B:
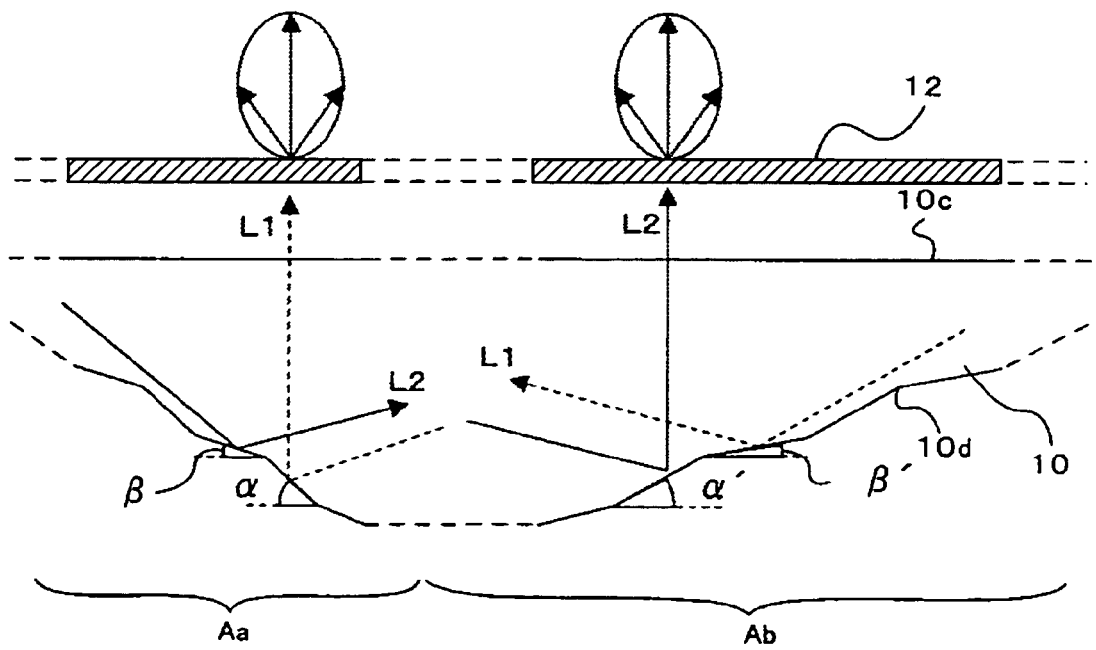

FIG. 3A is a lateral view showing an illumination device 2 having a characteristic, in which the boundary line C shifts from the center of the drawing to the left side as compared with the illumination device 1. As shown in FIG. 3A, the optical waveguide 10 has a bilateral symmetric shape with respect to the boundary line C. FIG. 3B shows an example of a predetermined pattern provided in the reflective surface 10*d* of the optical waveguide 10 for changing the angle of the light.

In the illumination device 2 which is bilaterally asymmetric with respect to the boundary line C, the pattern of the reflective surface 10*d* of the optical waveguide 10 has the same angled shape as the illumination device 1. As inclination angles in the illumination device 2, as shown in FIG. 3B, inclination angles of the pattern with respect to the light-emitting surface 10*c* in the left region Aa are defined as '$\alpha$' and '$\beta$', and inclination angles of the pattern with respect to the light-emitting surface 10*c* in the right region Ab are defined as '$\alpha$'' and '$\beta$''. Here, the inclination angles $\alpha$ and $\beta$ may be different from the inclination angles '$\alpha$'' and '$\beta$''.

As shown in FIG. 3B, similarly to the illumination device 1, even in the case of the illumination device 2, the light L2 emitted from the LED 16*a* is incident into the left region Aa through the light incident end face 10*a* located at the left end of the optical waveguide 10 and is totally reflected, repeatedly, between the light-emitting surface 10*c* and the reflective surface 10*d* having the inclination angles $\alpha$ and $\beta$ such that the incident angle of the light L2 decreases with respect to the light-emitting surface 10*c*. The light L2 passes through the left region Aa of the optical waveguide 10 and is then incident in the right region Ab from the boundary line C of the optical waveguide 10. In the right region Ab of the optical waveguide 10, the light L2 is repeatedly reflected between the light-emitting surface 10*c* and the reflective surface 10*d* having the inclination angles $\alpha$' and $\beta$' such that the incident angle of the light L2 increases with respect to the light-emitting surface 10*c*, whereby the propagation direction of the light L2 is then changed to a direction toward the light-emitting surface. As a result, the light L2 is emitted from the light-emitting surface 10*c* of the right region Ab of the optical waveguide 10 to the exterior.

Similarly to the light L2, the light L1 is incident into the right region Ab through the light incident end face 10*b* located at the right end of the optical waveguide 10 and is totally reflected repeatedly between the light-emitting surface 10*c* and the reflective surface 10*d* having the inclination angles $\alpha$' and $\beta$' such that the incident angle of the light L1 decreases with respect to the light-emitting surface 10*c*. The light L1 passes through the right region Ab of the optical waveguide 10 and is then incident in the left region Aa from the boundary line C of the optical waveguide 10. In the left region Aa of the optical waveguide 10, the light L1 is repeatedly reflected between the light-emitting surface 10*c* and the reflective surface 10*d* having the inclination angles $\alpha$ and $\beta$ such that the incident angle of the light L1 increases with respect to the light-emitting surface 10*c*, whereby the propagation direction of the light L1 is then changed to a direction toward the light-emitting surface. As a result, the light L1 is emitted from the light-emitting surface 10*c* of the left region Aa of the optical waveguide 10 to the exterior.

As described above, similarly to the illumination device 1, the inclination angles $\alpha$, $\beta$, $\alpha$', and $\beta$' in the illumination device 2 satisfy the conditions $0 \leq \beta \leq \alpha$ and $0 \leq \beta' \leq \alpha'$, and the inclination angles $\alpha$ and $\alpha$' are set in a range that can satisfy the conditions according to the embodiment. For example, as illustrated in the present embodiment, when the liquid crystal display device has a structure in which only the diffusion sheet 12 is disposed between the liquid crystal panel 14 and the illumination device 2, the inclination angles $\alpha$ and $\alpha$' are set in a range of 35° to 50°. As a result, when the LEDs 16*a* are turned on, the light can be emitted from the light-emitting surface 10*c* of the right region Ab to the exterior, and when the LEDs 16*b* are turned on, the light can be emitted from the light-emitting surface 10*c* of the left region Aa to the exterior.

As shown in FIG. 3A, each thickness of the light incident end faces 10*a* and 10*b* of the optical waveguide 10 may be different at both ends. When the light incident end face is thin, the probability that the light reaches the pattern of the reflective surface increases, so that the light-emitting luminance can increase in the light-emitting surface.

Display by Illumination Device

Figure 4A:
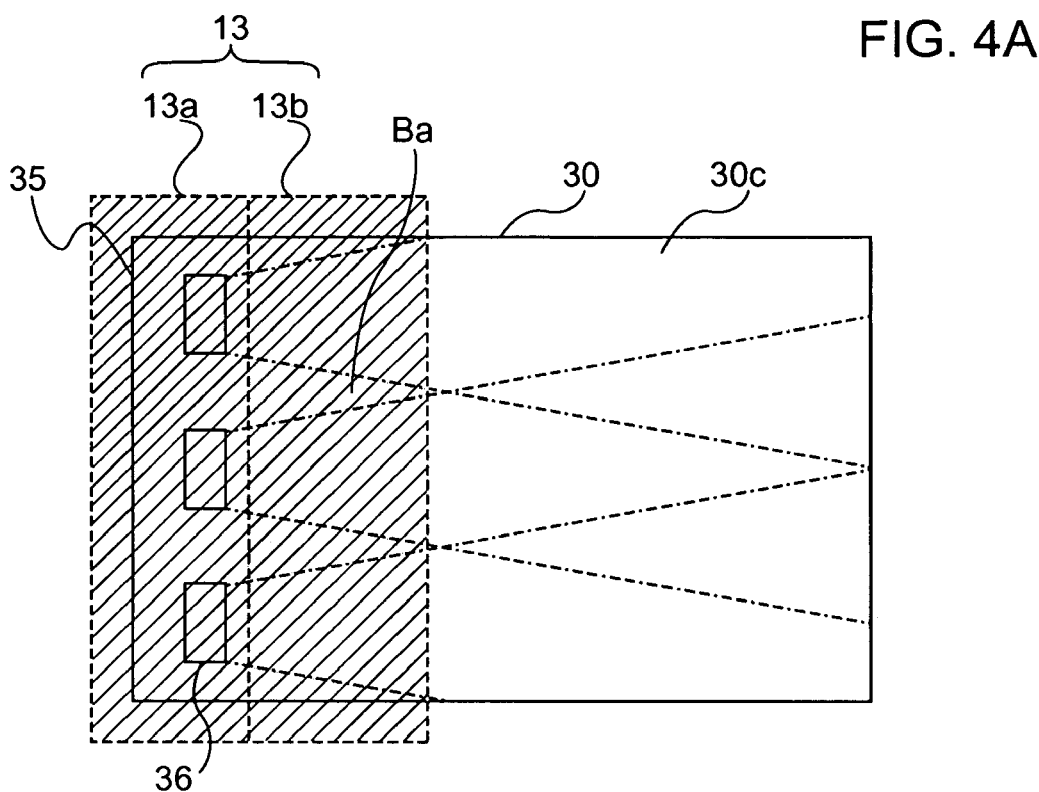
FIG. 4A is a plan view of a conventional illumination device.

Next, a light-emitting area of the illumination device of the invention will be described with reference to FIG. 4. FIG. 4A is a comparative example and is a schematic diagram showing the brightness of the optical waveguide 30 in a case in which a light source unit 35 is provided at only one side of the optical waveguide 30, which is the conventional illumination device. The conventional illumination device is constructed such that the entire surface of the light-emitting surface 30*c* becomes bright by using only the light emitted from a plurality of LEDs 36 of the light source unit 35. However, at locations near the light source unit 35 on the light-emitting surface 30*c*, since the diffusibility of the light is not sufficient, a shadow Ba may be generated between light components emitted from adjacent LEDs 36, that is, so-called light irregularity may be generated (referred to as 'a hot spot phenomenon'). In addition, the light emitted from the LEDs 36 may leak from the upper side of the light source unit 35. Therefore, in the conventional illumination device, when a double-sided tape 13 for bonding the liquid crystal panel and the illumination device is applied with a light shielding property, the light leakage is prevented by a portion 13a of the double-sided tape 13, and the light irregularity is prevented by a portion 13b of the double-sided tape 13.

Figure 4B:
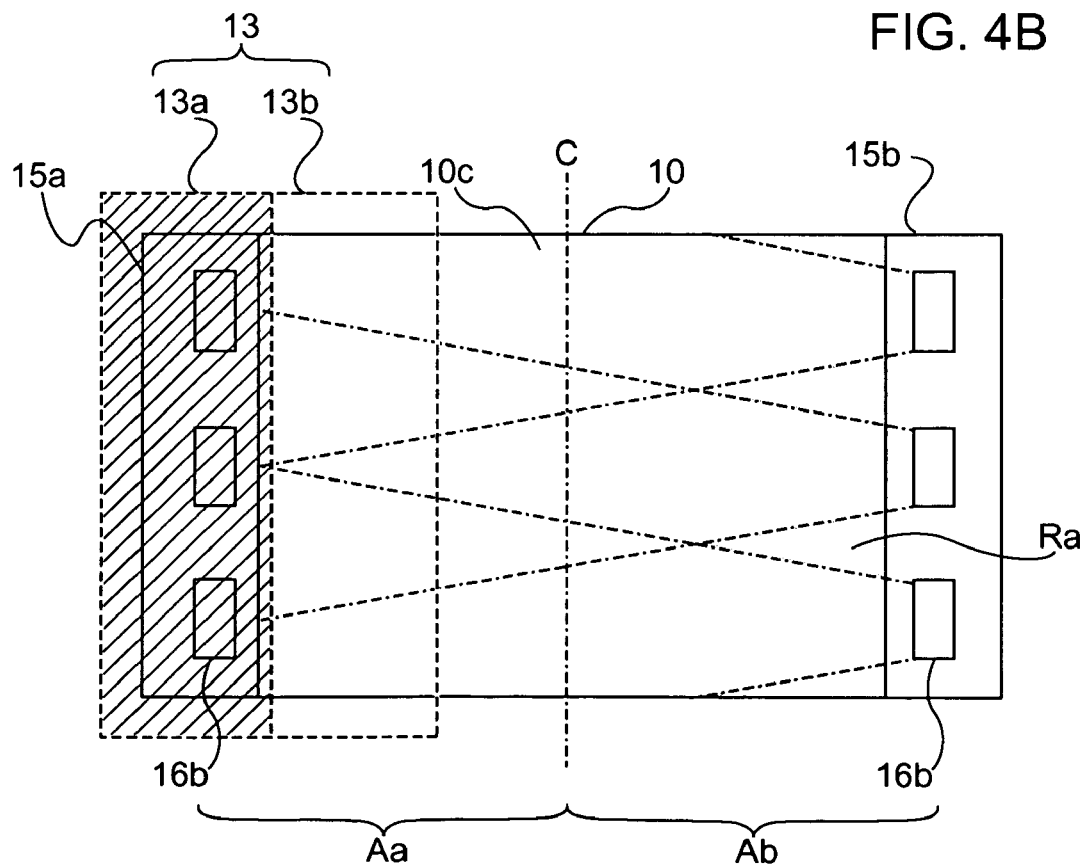
FIG. 4B is a plan view of the illumination device shown in FIG. 3.

On the other hand, as in the above-mentioned illumination devices 1 and 2, the illumination device of the invention has the plurality of LEDs provided at both ends of the optical waveguide 10, and has a structure in which the right region Ab of the optical waveguide 10 becomes bright by turning on the plurality of LEDs 16a provided at the left end of the optical waveguide 10 and the left region Aa of the optical waveguide 10 becomes bright by turning on the plurality of LEDs 16b provided at the right end of the optical waveguide 10. FIG. 4B is a schematic diagram showing the brightness of the optical waveguide 10 of the illumination device of the invention. In FIG. 4B, for the convenience of description, only an example in which the left region Aa becomes bright by turning on the plurality of LEDs 16b is shown.

As shown in FIG. 4B, similarly to the conventional illumination device, when the LEDs 16b are turned on, the diffusibility of the light is not sufficient at locations near the light source unit 15b of the light-emitting surface 10c of the right region Ab, whereby the shadow Ba may be generated between light components emitted from adjacent LEDs 16b. However, at this time, since the light emitted from the LEDs 16b is not emitted from the light-emitting surface 10c of the right region Ab to the exterior, the right region Ab does not become bright, such that the shadow Ba is not generated. In addition, since the light emitted from the LEDs 16b sufficiently diffuses on the light-emitting surface 10c of the left region Aa where the light is emitted to the exterior, the light-emitting surface 10c is not affected by the shadow Ba generated in the right region Ab. Therefore, the shadow Ba is not generated on the light-emitting surface 10c of the left region Ab.

In the same manner, when the LEDs 16a are turned on, the diffusibility of the light is not sufficient at locations near a light source unit 15a of a light-emitting surface 10c of the left region Aa, such that the shadow may be generated between light components emitted from adjacent LEDs 16a. However, at this time, since the light emitted from the LEDs 16a is not emitted from the light-emitting surface 10c of the left region Aa to the exterior, the shadow Ba is not generated. In addition, since the light emitted from the LEDs 16a sufficiently diffuses on the light-emitting surface 10c of the right region Ab where the light is emitted to the exterior, the light-emitting surface 10c is not affected by the shadow Ba generated in the left region Aa. Therefore, the shadow Ba is not generated on the light-emitting surface 10c of the right region Ab.

As described above, since the illumination device of the invention can prevent the shadow from being generated between the light components emitted from adjacent LEDs, that is, the light irregularity from occurring on the light-emitting surface, it does not need to have a unit in order to cover the light-emitting surface. Therefore, the double-sided tape 13 may have the light shielding property in order to prevent the leakage of the light from occurring at the upper side of the light source unit 15. Specifically, in FIG. 4B, only a portion 13a of the double-sided tape 13 may have the light shielding property. Therefore, the remaining portion 13b of the double-sided tape 13 may have a light transmitting property, which results in an increase in the light-emitting area of the optical waveguide.

Next, a liquid crystal display for the case of using the illumination device of the invention will be described with reference to FIG. 5. FIG. 5 is a plan view of the liquid crystal display device. In FIG. 5, the liquid crystal panel 14 is divided into two regions along a display dividing line Bp. The smaller of the two regions indicates a sub-screen D1 and the larger region indicates a main screen D2.

Here, the position of the boundary line C in the illumination device 2 shown in FIG. 3 aligns with a position of the display dividing line Bp. The sub-screen D1 performs display by transmitting light, which is emitted from the LEDs 16b and is radiated from the light-emitting surface of the left region Aa, and the main screen D2 performs display by transmitting light, which is emitted from the LEDs 16a and is radiated from the light-emitting surface of the right region Ab. In addition, the position of the display dividing line Bp of the liquid crystal panel 14 may almost align with the position of the boundary line C of the illumination device 2. In addition, even though the position of the display dividing line Bp does not perfectly align with the position of the boundary line C, the above-mentioned divided display can be achieved.

For example, in a case where the sub-screen D1 is used for simple information display such as time display or remaining battery level display, when a user desires to confirm information using only the sub-screen D1, the user can turn on only the LED 16b using a side button or the like, which results in a decrease in power consumption as compared with the related art.

With respect to the simple information display, such as time display or remaining battery level display, it is not necessary to always perform display requiring that a backlight is turned on, and the display may be confirmed using light reflected from the exterior. Therefore, for example, the liquid crystal panel 14 is constructed such that it is composed of a transflective liquid crystal panel, and reflectance of a portion corresponding to the sub-screen D1 of the liquid crystal display panel 14 is higher than that of a portion corresponding to the main screen D2. That is, the region corresponding to the sub-screen D1 of the liquid crystal display panel 14 is constructed to effectively use the reflective display and a region corresponding to the main screen D2 is constructed to effectively use the transmissive display. The sub-screen D1 mainly performs reflective display, so that the consumed power of the LEDs 16b can be further reduced. For example, this can be achieved by adjusting an area ratio between an opening for transmitting light and a reflective film formed in each pixel region of the liquid crystal display panel 14. Specifically, the ratio of the reflective film is large in the region corresponding to the sub-screen D1 and the ratio of the opening for transmitting light may be large in the region corresponding to the main screen D2.

In addition, if the sub-screen D1 effectively uses the reflective display, when the entire screen display is performed for making the sub-screen D1 and the main screen D2 perform display, the amount of light passing through the reflective film corresponding to the sub-screen D1 is different from the amount of light passing through the reflective film corresponding to the main screen D2. Therefore, there is a possibility that the sub-screen looks dark. In contrast, the illuminance of the LEDs 16b illuminating the sub-screen D1 is set to be higher than that of the LEDs 16a illuminating the main screen D2, or the number of the LEDs 16b illuminating the sub-screen D1 is set to be greater than that of the LEDs 16a illuminating the main screen D2, whereby the amount of light passing through the reflective film corresponding to the sub-screen D1 is substantially equal to the amount of light passing through the reflective film corresponding to the main screen D2. As a result, when the entire screen display is performed, the display of the sub-screen D1 and the display of the main screen D2 can be seen with the same brightness.

As described above, in the illumination device according to the first embodiment of the invention, the LEDs 16a and 16b are disposed at both ends of the optical waveguide 10. The optical waveguide 10 is formed such that the thickness thereof gradually decreases from the location of the boundary line C toward the light incident end faces located at both ends. The pattern of the reflective surface 10d of the optical waveguide 10 is determined such that the light from one light incident end face exceeds the critical angle with respect to the light-emitting surface in order to totally reflect the light from the other light incident end face with respect to the light-emitting surface. Therefore, when the LEDs 16a are turned on, the light is emitted from the light-emitting surface 10c of the right region Ab of the optical waveguide 10 with respect to the boundary line C to the exterior. On the other hand, when the LEDs 16b are turned on, the light is emitted from the light-emitting surface 10c of the left region Aa of the optical waveguide 10 to the exterior. That is, when the LEDs located at one end are turned on, only the region that is disposed opposite to the region of the optical waveguide having the light incident end face on which the light emitted from the LEDs is incident-can become bright.

In addition, in the illumination device according to the first embodiment of the invention, the light irregularity due to insufficient light diffusibility does not occur on the light-emitting surface, thus, it is not necessary for the double-sided tape to have the light shielding property to prevent the light irregularity. Therefore, the light-emitting area of the optical waveguide can be enlarged. In addition, the liquid crystal panel has the regions each having a different characteristic, and the individual regions are relatively disposed so as to align with the corresponding regions of the light-emitting surface for radiating the light. Therefore, only required LEDs can be turned on according to the region on which the user desires to perform display, which results in a decrease in consumed power.

Second Embodiment

Next, an illumination device according to a second embodiment of the invention will be described. In the illumination device according to the first embodiment, the optical waveguide 10 is constructed such that the thickness thereof is the largest at the location of the boundary line C and gradually decreases from the location of the boundary line C toward the light incident end faces located at both ends. In contrast, in the illumination device according to the second embodiment, the optical waveguide is entirely 'wedge-shaped' and is formed such that the thickness thereof gradually decreases from one light incident end face toward the other light incident end face. Hereinafter, the illumination device according to the second embodiment will be described with reference to FIG. 6.

Figure 6A:
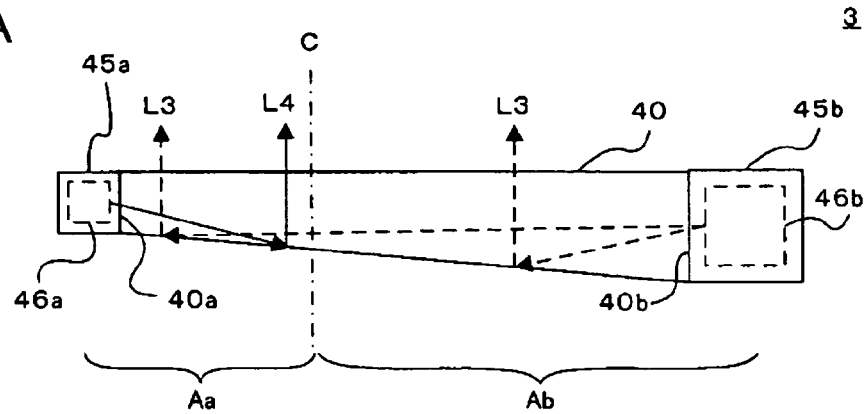
FIG. 6 is a lateral view of an illumination device according to a second embodiment of the invention.

FIG. 6A is a lateral view showing the structure of the illumination device 3 according to the second embodiment of the invention. As shown in FIG. 6A, the illumination device 3 has the wedge-shaped optical waveguide 40, and light source units provided at both ends of the optical waveguide 40. Specifically, the illumination device 3 has a light source unit 45a formed at the side of the optical waveguide 40 where a small light incident end face is formed and a light source unit 45b provided at the side of the optical waveguide 40 where a large light incident end face is formed. The light source units 45a and 45b have a plurality of LEDs 46a and a plurality of LEDs 46b serving as point light sources, respectively.

The LEDs 46a emit light L4 and the LEDs 46b emit light L3. FIG. 6A schematically shows a direction in which the light L4 in the optical waveguide 40 is reflected by a solid line and a direction in which that the light L3 in the optical waveguide 40 is reflected by a dotted line.

Similarly to the illumination device according to the first embodiment, in the optical waveguide 40, different patterns each having a predetermined shape are formed in a left region Aa and a right region Ab of a reflective surface 40d divided by the boundary line C in order to change the angle of the light with respect to the reflective surface. An example of these patterns is shown in FIG. 6B.

Figure 6B:
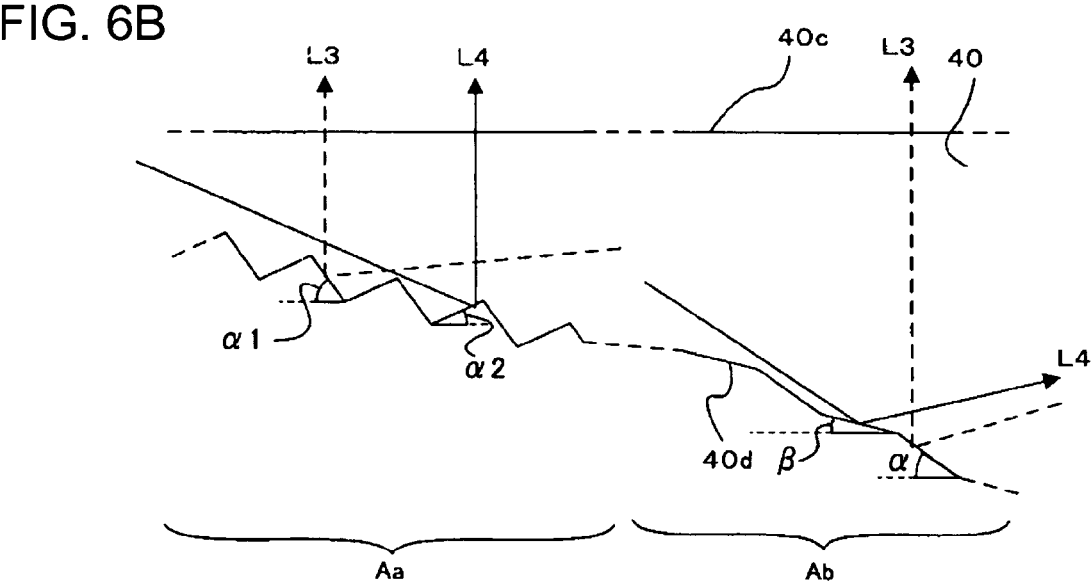

As shown in FIG. 6B, in the right region Aa of the optical waveguide 40 of the illumination device 3, the reflective surface 40d has a triangle pattern, an inclination angle of one inclined surface of the triangle pattern with respect to the light-emitting surface 40c is defined as '$\alpha 1$', and an inclination angle of the other inclined surface with respect to the light-emitting surface 40c is defined as '$\alpha 2$'. On the other hand, similarly to the illumination device 1, in the right region Ab of the optical waveguide 40 of the illumination device 3, the reflective surface 40d has an angled pattern. An inclination angle of one inclined surface of the angled pattern with respect to the light-emitting surface 40c is defined as '$\beta$', and an inclination angle of the other inclined surface with respect to the light-emitting surface 40c is defined as '$\alpha$'. In FIG. 6B, a solid line indicates a path of the light L4 emitted from the LED 46a and a dotted line indicates a path of the light L3 emitted from the LED 46b.

The light L4 emitted from the plurality of LEDs 46a provided at the left end of the optical waveguide 40 is incident into the optical waveguide 40 through the small light incident end face 40a of the optical waveguide 40. At the left region Aa, the light L4 is repeatedly reflected between the light-emitting surface 40c and the reflective surface 40d forming an inclination angle $\alpha 2$ such that an inclination angle of the light L4 increases with respect to the light-emitting surface 40c, whereby the propagation direction of the light L4 is changed to a direction toward the light-emitting surface. In this state, the light L4 is emitted from the light-emitting surface 40c corresponding to the left region Aa of the optical waveguide 40 to the exterior.

A portion of the light L4 is not emitted from the light-emitting surface 40c corresponding to the left region Aa to the exterior, and passes the boundary line C to be incident into the right region Ab. However, when the light L4 is incident into the right region Ab, it is repeatedly reflected between the light-emitting surface 40c and the reflective surface 40d forming inclination angles $\alpha$ and $\beta$ such that an inclination angle of the light L4 decreases with respect to the light-emitting surface 40c. Therefore, the light L4 is totally reflected on the light-emitting surface 40c of the right region Ab, so that it is not emitted to the exterior through the light-emitting surface corresponding to the right region Ab.

On the other hand, light L3 emitted from the plurality of LEDs 46b provided at the right end of the optical waveguide 40 is incident into the optical waveguide 40 through the large light incident end face 40b of the optical waveguide 40. At the right region Ab, the light L3 is repeatedly reflected between the light-emitting surface 40c and the reflective surface 40d forming inclination angles $\alpha$ and $\beta$ such that an inclination angle of the light L3 increases with respect to the light-emitting surface 40c, whereby the propagation direction of the light L3 is changed to a direction toward the light-emitting surface. In this state, the light L3 is emitted from the light-emitting surface 40c corresponding to the right region Ab of the optical waveguide 40 to the exterior.

A portion of the light L3 is not emitted from the light-emitting surface 40c corresponding to the right region Ab to the exterior, and passes the boundary line C to be incident on the left region Aa. At this time, the light L3 is repeatedly reflected between the light-emitting surface 40c and the reflective surface 40d forming an inclination angle α1 such that an inclination angle of the light L3 increases with respect to the light-emitting surface 40c, whereby the propagation direction of the light L3 is changed to a direction toward the light-emitting surface and the light L3 is emitted to the exterior. Therefore, in the illumination device 3, the entire light-emitting surface 40c can become bright by making the LEDs 40b turned on.

Figure 6C:
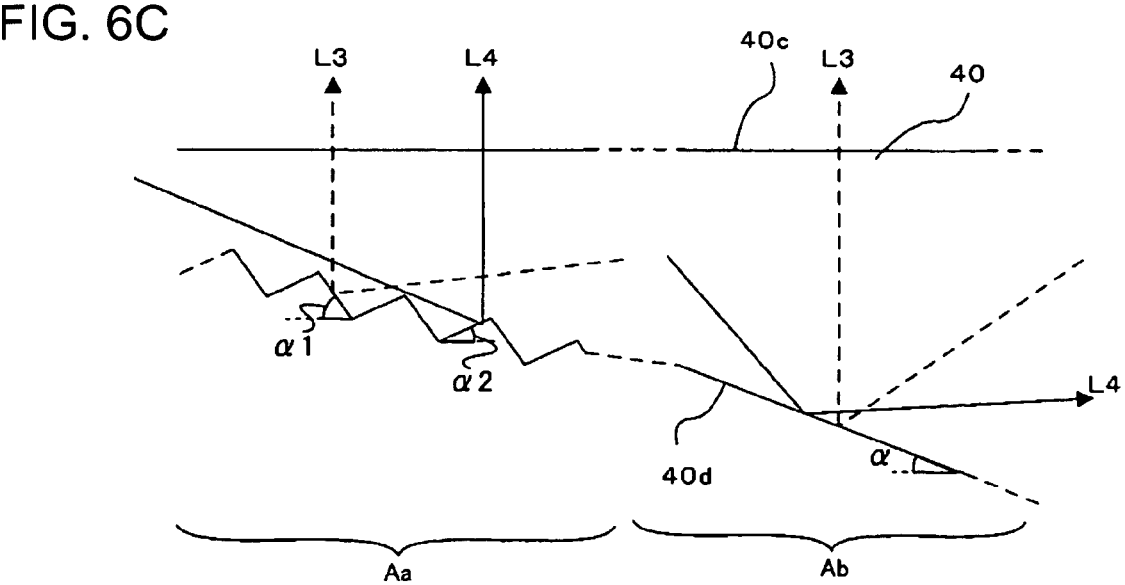

The reflective surface 40d of the left region Ab of the optical waveguide 40 may be an inclined surface in which a specific pattern shown in FIG. 6C is not provided and which has an inclination angle α (that is, corresponding to the case of β=α in FIG. 6B). When the reflective surface 40d is made to be the inclined surface in which the pattern is not provided, so that a utilization efficiency of the light can increase. At this time, at the right region Ab of the optical waveguide 40, the light L3 emitted from the LED 46b is repeatedly reflected between the reflective surface 40d and the light-emitting surface 40c, such that the propagation direction of the light L3 is changed to a direction toward a light-emitting surface, whereby the light L3 is emitted from the light-emitting surface 40c of the right region Ab to the exterior. On the other hand, the light L4 emitted from the LED 46a is repeatedly reflected between the reflective surface 40d and the light-emitting surface 40c. And then, the light L4 is totally reflected over and over again such that the incident angle of the light L4 on the light-emitting surface 40c increases by 2α whenever it is reflected. Therefore, the light L4 is not emitted from the light-emitting surface 40c of the right region Ab to the exterior. That is, even though the reflective surface 40d is an inclined surface, it can perform the same function as the reflective surface 40d of the right region Ab, shown in FIG. 6B.

According to the second embodiment, similarly to the first embodiment, the inclination angles α and β are set in a range that can satisfy the condition $0 \leq \beta \leq \alpha$, the inclination angle α is set in a range that can satisfy the condition according the embodiment, and the inclination angles α1 and α2 are set in a range that can satisfy the condition according the embodiment. For example, when the liquid crystal display device has a structure in which only the diffusion sheet 12 illustrated in the first embodiment is disposed between the liquid crystal panel 14 and the illumination device 2, the inclination angles α, α1, and α2 are set in a range of 35° to 50°. In this way, when the LEDs 46a are turned on, the light can be emitted from only the light-emitting surface 40c of the left region Aa to the exterior and when the LEDs 46b are turned on, the light can be emitted from the entire surface of the light-emitting surface 40c to the exterior.

Here, when the illumination device 3 according to the second embodiment is applied to the liquid crystal panel 14 shown in FIG. 5, the light emitted from the light-emitting surface 40c of the left region Aa is allocated in the sub-screen D1, and the light emitted from the light-emitting surface 40c of the right region Ab is allocated in the main screen D2. Therefore, when the LEDs 46a are turned on, only the sub-screen D1 is illuminated, and when the LEDs 46b are turned on, both the sub-screen D1 and the main screen D2 are illuminated.

As such, similarly to the first embodiment, in the second embodiment, the light can be emitted from a portion of the light-emitting surface of the optical waveguide to the exterior by the LEDs turned on. According to the second embodiment, when the LEDs 46a are turned on, the light is emitted to the exterior from only the light-emitting surface 40c of the left region Aa of the optical waveguide 40 which is a region located at the same side as the light incident end face 40a, and when the LEDs 46b are turned on, the light is emitted to the exterior from the entire light-emitting surface of the optical waveguide 40. In addition, in a case of making the optical waveguide wedge-shaped such that the light is emitted from the entire light-emitting surface to the exterior, if the thickness of the optical waveguide is made to become smaller from the light incident end face toward the end face opposite to it, a light-emitting efficiency can be improved at the opposite side of the light incident end face. Therefore, it is possible to achieve regular brightness in the light-emitting surface.

Modification of Liquid Crystal Display Device

Next, a modification of the liquid crystal display device, in which the illumination according to the invention is applied, will be described.

First Modification

The above-mentioned liquid crystal display device 100 has a structure in which only the diffusion sheet is disposed between the liquid crystal panel and the illumination device. However, according to the structure, the inclination angle α in the illumination device 1, the inclination angles α and α' in the illumination device 2, and the inclination angles α, α1, and α2 in the illumination device 3 are respectively set in a range of 35° to 50°, because it is necessary for the light to be emitted in a substantially vertical direction from the optical waveguide. For this reason, it is required that the reflective surface of the optical waveguide has a relatively steep shape in each of the illumination devices 1 to 3. Therefore, in the first modification, a prism sheet is disposed between the liquid crystal panel and the diffusion sheet in the liquid crystal display device 100. The prism sheet has a surface with unevenness of which the section is substantially triangular formed therein. As such, even though the light is not emitted substantially vertically from the optical waveguide toward the liquid crystal panel, when the light is made to pass through the prism sheet, the light can be emitted in a direction vertical to the liquid crystal panel. Therefore, the steep shape of the reflective surface of the optical waveguide can be alleviated.

Figure 7A:
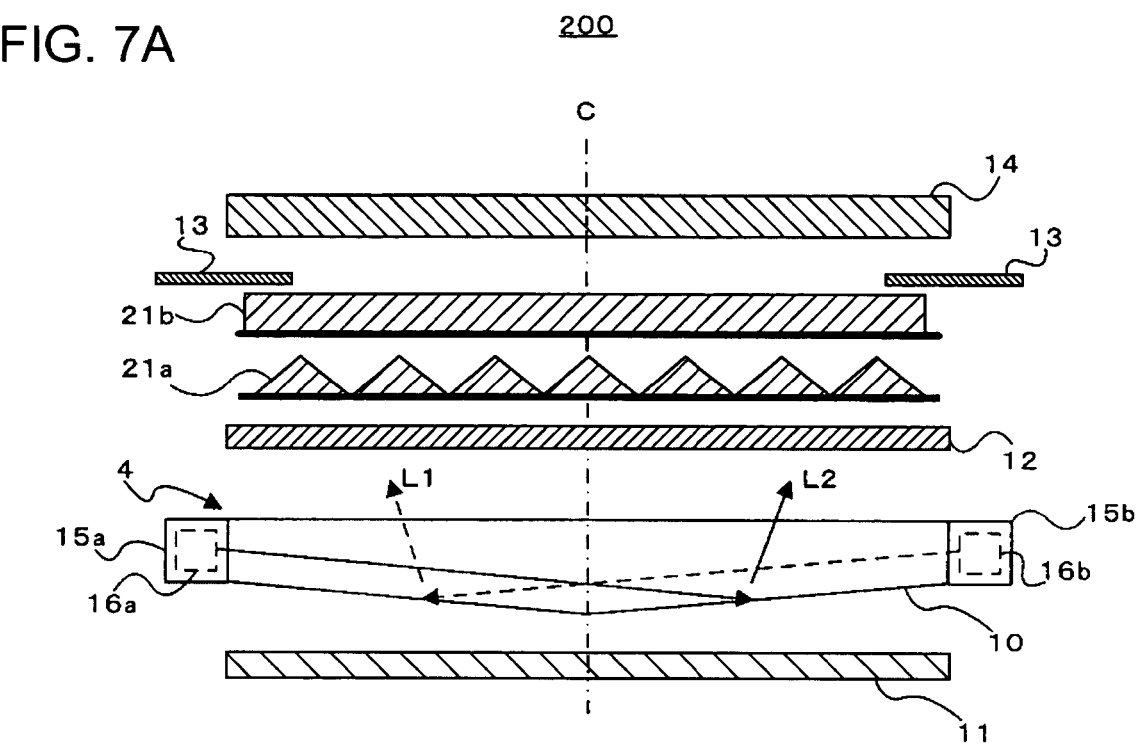
FIG. 7 is a lateral view of a liquid crystal display device according to a first modification of the invention.

FIG. 7A is a lateral view schematically showing the structure of the liquid crystal display device 200 according to the first modification in which the illumination device of the invention is applied. The liquid crystal display device 200 is different from the liquid crystal display device 100 according to the first embodiment in that two prism sheets 21a and 21b are disposed between the diffusion sheet 12 and the liquid crystal panel 14.

Each of the two prism sheets 21a and 21b has a function for condensing the light L1 and L2 having passed through the diffusion sheet 12 on the rear surface of the liquid crystal panel 14, and a section of one prism sheet has a shape of a triangular prism repeatedly formed such that triangular prisms extend in a predetermined direction (a direction of a side perpendicular to the section). In addition, the two prism sheets 21a and 21b are disposed such that sides where prism shapes extend are orthogonal to each other. Thereby, it is possible to improve a condensing efficiency of the light emitted from the optical waveguide 10.

Figure 7B:
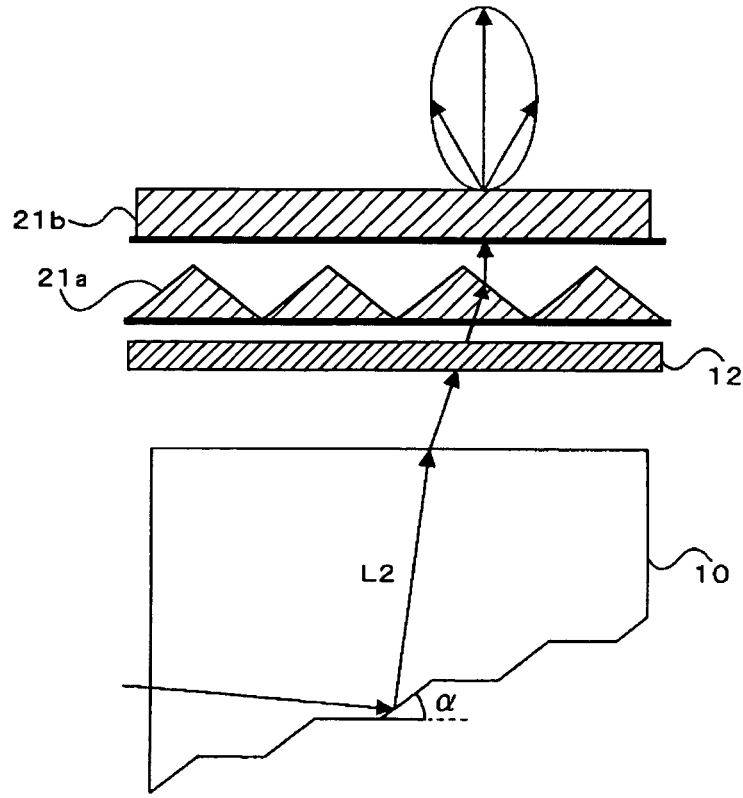

FIG. 7B is a schematic diagram illustrating an aspect that the light L2 is reflected in the illumination device 4 of the liquid crystal display device 200. For convenience of the description, only the inclination angle α of the reflective surface of the optical waveguide is shown and the inclination angle β is not shown in the drawing. As shown in FIG. 7B, even though the light L2 is not vertically emitted from the optical waveguide 10, the light L2 progresses to be perpendicular to the liquid crystal panel 14 through the prism sheets 21a and 21b. At this time, in order to emit the light in the optical waveguide 10 to the exterior, the inclination angle α of the reflective surface may be in a range of 20° to 35°, and the inclination of the reflective surface 10d of the optical waveguide 10 can be alleviated compared to the liquid crystal display device 1.

As described above, if any one of the illumination devices 1, 2, and 3 is applied as the illumination device 4 of the liquid crystal display device 200 in which the two prism sheets are disposed, the inclination angle α in the illumination device 1, the inclination angles α and α' in the illumination device 2, and the inclination angles α, α1, and α2 in the illumination device 3 can be respectively set in a range of 20° to 35°. Therefore, it is possible to further alleviate the inclined shape of the reflective surface of the optical waveguide as compared to the first and second embodiments.

Second Modification

Next, as another example of the liquid crystal display device using the prism sheet, a case will be described with reference to FIG. 8 in which the uneven shape of the prism sheet is disposed to be opposite to the light-emitting surface of the optical waveguide.

Figure 8A:
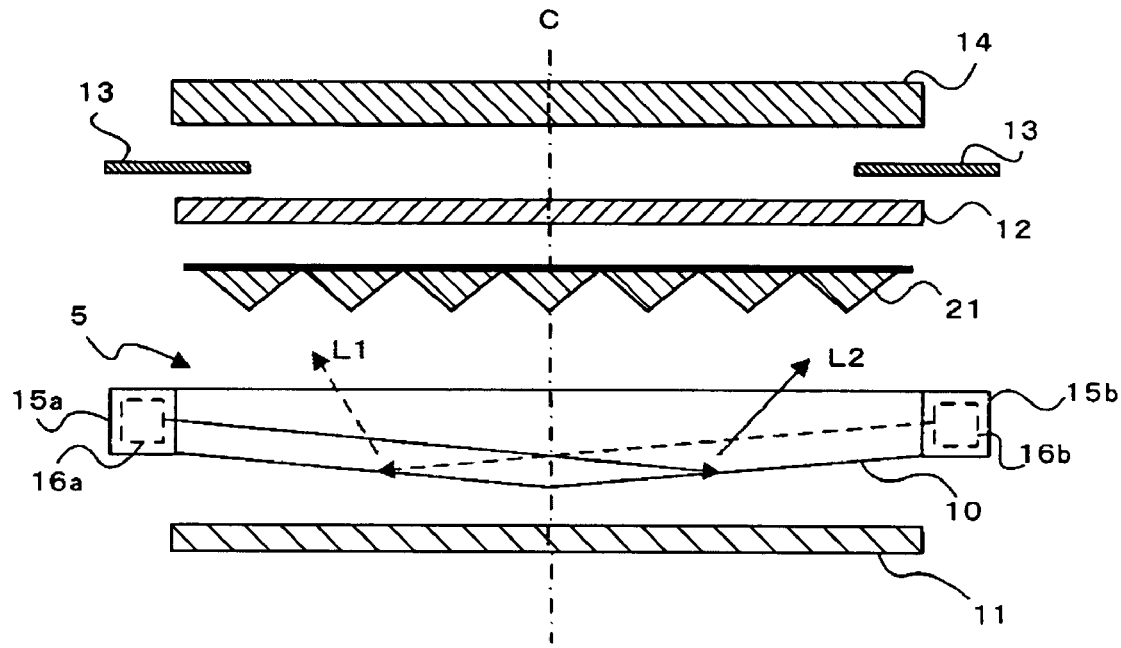
FIG. 8 is a lateral view of a liquid crystal display device according to a second modification of the invention.

FIG. 8A is a lateral view schematically showing the structure of the liquid crystal display device 300 according to the second modification to which the illumination device of the invention is applied. In a liquid crystal display device 300, a prism sheet 21 is disposed between the diffusion sheet 12 and the optical waveguide 10 such that the uneven shape is opposite to the light-emitting surface of the optical waveguide. The prism sheet 21 disposed such that the unevenness shape is opposite to the light-emitting surface of the optical waveguide is called 'a reverse prism type'. At this time, the diffusion sheet 12 prevents light interference (moiré) from occurring between the prism sheet 21 and the liquid crystal panel 14.

Figure 8B:
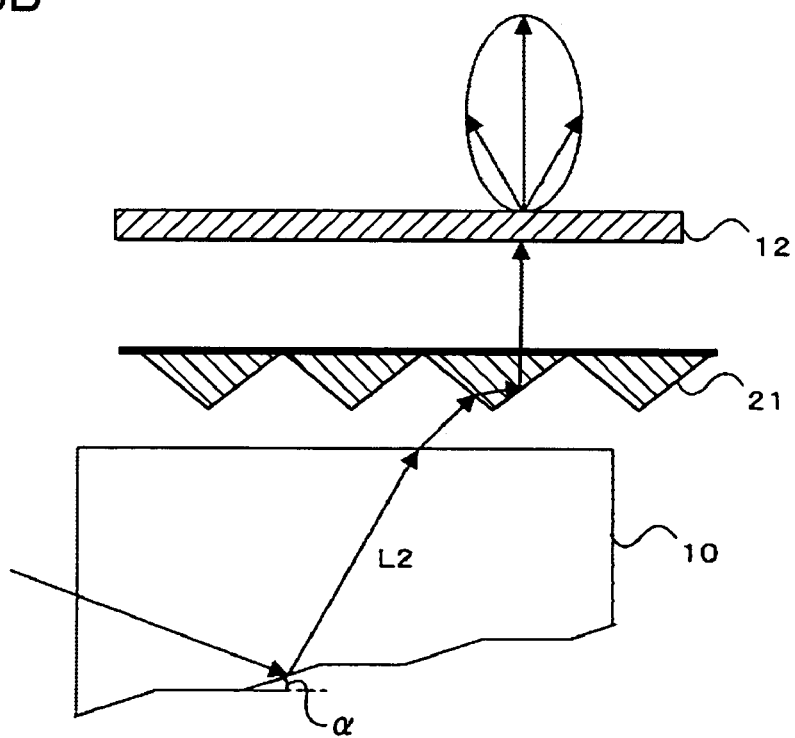

FIG. 8B is a schematic diagram illustrating an aspect that the light L2 is reflected in the illumination device 5 of the liquid crystal display device 300. For convenience of the description, only the inclination angle α of the reflective surface of the optical waveguide is shown and the inclination angle β is not shown in the drawing.

As shown in FIG. 8B, even the reverse prism type of prism sheet 21 allows the light emitted from the optical waveguide 10 at an angle slightly more than the critical angle to progress in a substantially vertical direction with a high efficiency, that is, a direction heading the liquid crystal panel 14. For this reason, at this time, in order to emit the light in the optical waveguide 10 to the exterior, the inclination angle α of the reflective surface may be in a range of 0.5° to 5°.

As described above, similarly to the first modification, if any one of the illumination devices 1, 2, and 3 is applied as the illumination device 5 of the liquid crystal display device 300 in which the reverse prism type of prism sheet is disposed, the inclination angle α in the illumination device 1, the inclination angles α and α' in the illumination device 2, and the inclination angles α, α1, and α2 in the illumination device 3 can be respectively set in a range of 0.5° to 5°. Therefore, it is possible to further alleviate the inclined shape of the reflective surface of the optical waveguide 10.

Other Modification

As shown in FIG. 4, in the above-mentioned embodiment, although the plurality of light sources are disposed in a longitudinal direction of the light incident end face, the light sources may be disposed at the end of the light incident end face. In this case, the light-emitting direction from the light source may not be vertical to the light incident end face, but may be inclined. That is, the light sources may be disposed at corner portions of the sides of the optical waveguide whose planar shape is rectangular such that the light-emitting direction is a diagonal direction.

Electronic Apparatus

Next, a case will be described in which the above-mentioned liquid crystal display device is applied to an electronic apparatus.

FIG. 9 is a diagram showing a cellular phone 1000 which is an example of the electronic apparatus according to the invention. The cellular phone 1000 includes a main body unit 1001 that has various operation main buttons 510 such as a dial and an auxiliary operation side button 520 and a microphone built therein and a display unit 1002 that has a display screen, an antenna, and a speaker built therein. The main body unit 1001 and the display unit 1002 are pivotally attached to each other by a bonding portion 500. This cellular phone is a slide-type cellular phone in which the main body unit 1001 and the display unit 1002 are rotated about the bonding portion 500 and overlaps each other, such that the cellular phone is closed. The display unit 1002 has a structure with the above-mentioned liquid crystal display device built therein and a display screen of a liquid crystal panel 14 can be seen thereon. The display screen has a sub-screen D1 for displaying simple display information such as a time or a remaining battery level, and a main screen D2 for displaying a functional menu or the like.

Figure 9A:
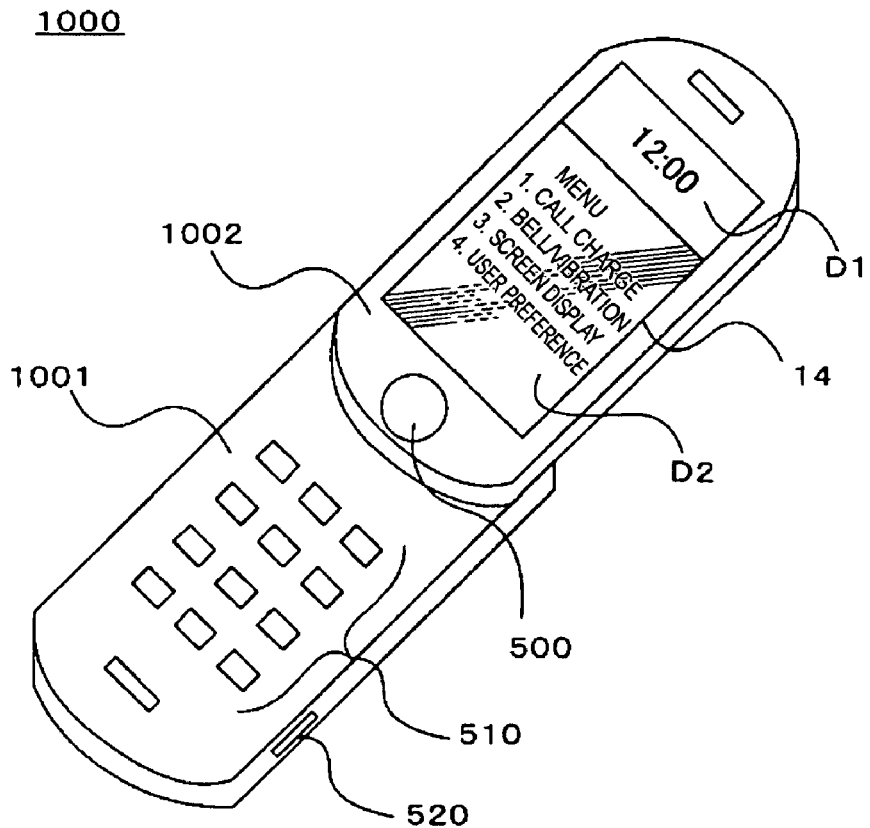
FIG. 9 is a perspective view showing an appearance of a cellular phone which is an example of an electronic apparatus.
Figure 9B:
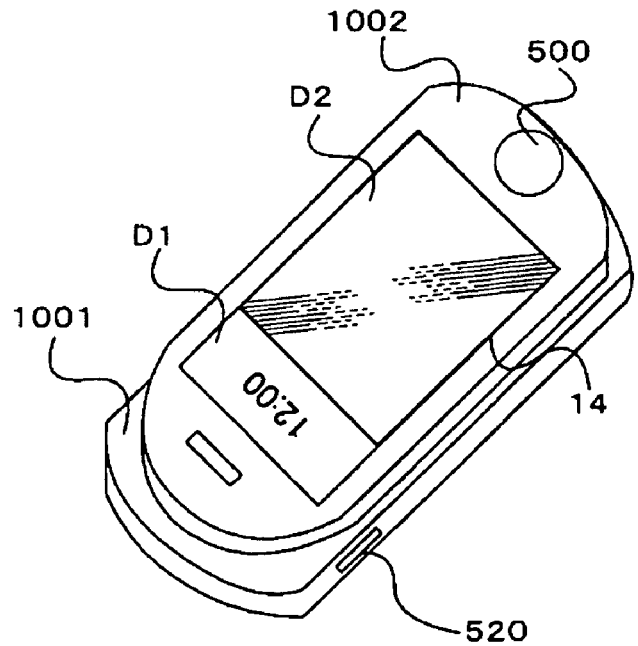

According to the present embodiment, as shown in FIG. 9A, when the display unit 1002 opens from the main body unit 1001, the sub-screen D1 and the main screen D2 of the liquid crystal panel 14 are turned on, thereby displaying a predetermined image. On the other hand, as shown in FIG. 9B, when the display unit 1002 overlaps the main body unit 1001, the main screen D2 is turned off and only the sub-screen D1 is turned on to display a predetermined image. In addition, when the sub-screen D1 is also turned off in a state in which the display unit 1002 overlaps the main body unit 1001, so that only the sub-screen D1 can be turned on by operating the side button 520.

Specific examples of the electronic apparatus in which the liquid crystal display device according to the invention can be applied include a mobile personal computer (a notebook computer), a liquid crystal television, a view-finder-type or monitor-direct-view-type video tape recorder, a car navigation device, a pager, an electronic note, an electronic calculator, a word processor, a workstation, a video phone, a POS terminal, a digital still camera or the like.

What is claimed is:

1. An electro-optical device comprising:
    a display panel including a main screen and a sub-screen, the main screen and sub-screen disposed on opposing sides of a display dividing line, the sub-screen having a higher reflectance than the main screen; and an illumination device used as a back light for the display panel, the illumination device including an optical waveguide having first and second end faces spaced apart from each other and facing each other, the first end face being thinner than the second end face, the illumination device further including first and second light sources disposed at the first and second end faces, respectively, the optical waveguide further including:

a light-emitting surface extending between the first and second end faces, the light-emitting surface including first and second emitting regions disposed on opposing sides of a boundary line, the first and second emitting regions being adjacent to the first and second light incident end faces, respectively, and a reflective surface extending between the first and second end faces, the reflective surface including first and second reflecting portions disposed on opposing sides of the boundary line, the first and second reflecting portions being adjacent to the first and second end faces, respectively, wherein the display panel and the illumination device are disposed with the display dividing line and the boundary line aligned so that the first emitting region and the first reflecting portion correspond with the sub-screen and the second emitting region and the second reflecting portion correspond with the main screen, the first reflecting portion reflects light from the second light source toward the first emitting region and the sub-screen, and the second reflecting portion reflects light from the first light source toward the second emitting region and the main screen.

2. The electro-optical according to claim 1, wherein each of the first and second reflecting portions are inclined so that a distance between the light-emitting surface and the reflective surface gradually decreases from the predetermined boundary line toward each of the first and second end faces.

3. The electro-optical device according to claim 1, wherein at least one of the first and second reflecting portions has a predetermined pattern.

4. An electronic apparatus comprising the electro-optical device according to claim 1 in a display unit.

5. The electro-optical device according to claim 1, wherein, when only the first light source is turned on, light from the second emitting region is brighter than light from the first emitting region.

6. The electro-optical device according to claim 1, wherein, when only one of the sub-screen and the main screen performs display, only one of the first and second light sources corresponding to the one of the sub-screen and the main screen is turned on.

7. An electro-optical device comprising:

a display panel including a main screen and a sub-screen, the main screen and sub-screen disposed on opposing sides of a display dividing line, the main screen being larger than the sub-screen, the sub-screen having a higher reflectance than the main screen; and an illumination device used as a back light for the display panel, the illumination device including an optical waveguide having first and second end faces spaced apart from each other and facing each other, the first end face being thinner than the second end face, the illumination device further including first and second light sources disposed at the first and second end faces, respectively, the optical waveguide further including:

a light-emitting surface extending between the first and second end faces, the light-emitting surface including first and second emitting regions disposed on opposing sides of a boundary line, the first and second emitting regions being adjacent to the first and second light incident end faces, respectively, the second emitting region being larger than the first emitting region, and a reflective surface extending between the first and second end faces, the reflective surface including first and second reflecting portions being disposed on opposing sides of the boundary line, the first and second reflecting portions being adjacent to the first and second end faces, respectively, the second reflecting portion being larger than the first reflecting portion, wherein the display panel and the illumination device are disposed with the display dividing line and the boundary line aligned so that the first emitting region and the first reflecting portion correspond with the sub-screen and the second emitting region and the second reflecting portion correspond with the main screen, the first reflecting portion reflects light from the second light source toward the first emitting region and the sub-screen, and the second reflecting portion reflects light from the first light source toward the second emitting region and the main screen.

* * * * *